US007639885B2

(12) United States Patent
Wang et al.

(10) Patent No.: US 7,639,885 B2
(45) Date of Patent: *Dec. 29, 2009

(54) DECODING AND ERROR CORRECTION IN 2-D ARRAYS

(75) Inventors: Jian Wang, Beijing (CN); Zhou Chen Lin, Beijing (CN); Yue Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,810

(22) Filed: Jun. 2, 2008

(65) Prior Publication Data

US 2009/0110308 A1    Apr. 30, 2009

Related U.S. Application Data

(60) Continuation of application No. 11/470,338, filed on Sep. 6, 2006, now Pat. No. 7,386,191, which is a division of application No. 10/284,422, filed on Oct. 31, 2002, now Pat. No. 7,116,840.

(51) Int. Cl.
*G06K 9/36* (2006.01)
*G06K 9/18* (2006.01)
*G06K 9/32* (2006.01)
*G09G 5/00* (2006.01)

(52) U.S. Cl. .................. 382/233; 382/182; 382/296; 345/649

(58) Field of Classification Search .............. 382/100, 382/232–233, 274–275, 289, 291–297, 182; 345/649; 235/454
See application file for complete search history.

(56) References Cited

U.S. PATENT DOCUMENTS

| 4,686,329 A | 8/1987 | Joyce |
| 4,742,558 A | 5/1988 | Ishibashi et al. |
| 4,745,269 A | 5/1988 | Van Gils |
| 4,829,583 A | 5/1989 | Monroe et al. |
| 4,941,124 A | 7/1990 | Skinner, Jr. |
| 5,032,924 A | 7/1991 | Brown et al. |
| 5,051,736 A | 9/1991 | Bennett et al. |
| 5,073,966 A | 12/1991 | Sato et al. |
| 5,146,552 A | 9/1992 | Cassorla et al. |
| 5,153,928 A | 10/1992 | Iizuka |

(Continued)

FOREIGN PATENT DOCUMENTS

CN    1303494    7/2001

(Continued)

OTHER PUBLICATIONS

U.S. Appl. No. 11/066,800, filed Feb. 25, 2005, Wang, et al.

(Continued)

*Primary Examiner*—Kanji Patel
(74) *Attorney, Agent, or Firm*—Perkins Coie LLP

(57) ABSTRACT

A system and process for determining the location of a captured image from a larger image is described. A non-repeating sequence may be folded into a non-repeating array in which the array is unique for every sub window of a given size. The image of the sub window may be captured and its location determined within the non-repeating array.

10 Claims, 10 Drawing Sheets

U.S. PATENT DOCUMENTS

| | | |
|---|---|---|
| 5,181,257 A | 1/1993 | Steiner et al. |
| 5,196,875 A | 3/1993 | Stuckler |
| 5,235,654 A | 8/1993 | Anderson et al. |
| 5,243,149 A | 9/1993 | Comerford et al. |
| 5,247,137 A | 9/1993 | Epperson |
| 5,253,336 A | 10/1993 | Yamada |
| 5,288,986 A | 2/1994 | Pine et al. |
| 5,294,792 A | 3/1994 | Lewis et al. |
| 5,335,150 A | 8/1994 | Huang |
| 5,365,598 A | 11/1994 | Sklarew |
| 5,394,487 A | 2/1995 | Burger et al. |
| 5,398,082 A | 3/1995 | Henderson et al. |
| 5,414,227 A | 5/1995 | Schubert et al. |
| 5,442,147 A | 8/1995 | Burns et al. |
| 5,448,372 A | 9/1995 | Axman et al. |
| 5,450,603 A | 9/1995 | Davies |
| 5,454,054 A | 9/1995 | Iizuka |
| 5,471,533 A | 11/1995 | Wang et al. |
| 5,477,012 A | 12/1995 | Sekendur |
| 5,511,156 A | 4/1996 | Nagasaka |
| 5,546,515 A | 8/1996 | Mochizuki |
| 5,581,637 A | 12/1996 | Cass et al. |
| 5,581,682 A | 12/1996 | Anderson et al. |
| 5,587,558 A | 12/1996 | Matsushima |
| 5,612,524 A | 3/1997 | Sant'Anselmo et al. |
| 5,626,620 A | 5/1997 | Kieval et al. |
| 5,629,499 A | 5/1997 | Flickinger et al. |
| 5,635,697 A | 6/1997 | Shellhammer et al. |
| 5,644,652 A | 7/1997 | Bellegarda et al. |
| 5,652,412 A | 7/1997 | Lazzouni et al. |
| 5,661,291 A | 8/1997 | Ahearn et al. |
| 5,661,506 A | 8/1997 | Lazzouni et al. |
| 5,670,897 A | 9/1997 | Kean |
| 5,686,718 A | 11/1997 | Iwai et al. |
| 5,692,073 A | 11/1997 | Cass |
| 5,719,884 A | 2/1998 | Roth et al. |
| 5,721,940 A | 2/1998 | Luther et al. |
| 5,726,435 A | 3/1998 | Hara et al. |
| 5,727,098 A | 3/1998 | Jacobson |
| 5,748,808 A | 5/1998 | Taguchi et al. |
| 5,754,280 A | 5/1998 | Kato et al. |
| 5,756,981 A | 5/1998 | Roustaei et al. |
| 5,765,176 A | 6/1998 | Bloomberg |
| 5,774,602 A | 6/1998 | Taguchi et al. |
| 5,817,992 A | 10/1998 | D'Antonio |
| 5,818,436 A | 10/1998 | Imai et al. |
| 5,822,436 A | 10/1998 | Rhoads |
| 5,822,465 A | 10/1998 | Normile et al. |
| 5,825,015 A | 10/1998 | Chan et al. |
| 5,825,892 A | 10/1998 | Braudaway et al. |
| 5,850,058 A | 12/1998 | Tano et al. |
| 5,852,434 A | 12/1998 | Sekendur |
| 5,855,483 A | 1/1999 | Collins et al. |
| 5,855,594 A | 1/1999 | Olive et al. |
| 5,875,264 A | 2/1999 | Carlstrom |
| 5,890,177 A | 3/1999 | Moody et al. |
| 5,897,648 A | 4/1999 | Henderson |
| 5,898,166 A | 4/1999 | Fukuda et al. |
| 5,902,968 A | 5/1999 | Sato et al. |
| 5,937,110 A | 8/1999 | Petrie et al. |
| 5,939,703 A | 8/1999 | Hecht et al. |
| 5,960,124 A | 9/1999 | Taguchi et al. |
| 5,961,571 A | 10/1999 | Gorr et al. |
| 5,995,084 A | 11/1999 | Chan et al. |
| 6,000,614 A | 12/1999 | Yang et al. |
| 6,000,621 A | 12/1999 | Hecht et al. |
| 6,000,946 A | 12/1999 | Snyders et al. |
| 6,005,973 A | 12/1999 | Seybold et al. |
| 6,041,335 A | 3/2000 | Merritt et al. |
| 6,044,165 A | 3/2000 | Perona et al. |
| 6,044,301 A | 3/2000 | Hartlaub et al. |
| 6,052,481 A | 4/2000 | Grajski et al. |
| 6,054,990 A | 4/2000 | Tran |
| 6,076,734 A | 6/2000 | Dougherty et al. |
| 6,081,261 A | 6/2000 | Wolff et al. |
| 6,108,453 A | 8/2000 | Acharya |
| 6,141,014 A | 10/2000 | Endo et al. |
| 6,151,424 A | 11/2000 | Hsu |
| 6,157,935 A | 12/2000 | Tran et al. |
| 6,181,329 B1 | 1/2001 | Stork et al. |
| 6,186,405 B1 | 2/2001 | Yoshioka |
| 6,188,392 B1 | 2/2001 | O'Connor et al. |
| 6,192,380 B1 | 2/2001 | Light et al. |
| 6,202,060 B1 | 3/2001 | Tran |
| 6,208,771 B1 | 3/2001 | Jared et al. |
| 6,208,894 B1 | 3/2001 | Schulman et al. |
| 6,219,149 B1 | 4/2001 | Kawata et al. |
| 6,226,636 B1 | 5/2001 | Abdel-Mottaleb et al. |
| 6,230,304 B1 | 5/2001 | Groeneveld et al. |
| 6,243,071 B1 | 6/2001 | Shwarts et al. |
| 6,249,614 B1 | 6/2001 | Kolesnik et al. |
| 6,254,253 B1 | 7/2001 | Daum et al. |
| 6,256,398 B1 | 7/2001 | Chang |
| 6,259,827 B1 | 7/2001 | Nichani |
| 6,278,968 B1 | 8/2001 | Franz et al. |
| 6,294,775 B1 | 9/2001 | Seibel et al. |
| 6,310,988 B1 | 10/2001 | Flores et al. |
| 6,327,395 B1 | 12/2001 | Hecht et al. |
| 6,330,976 B1 | 12/2001 | Dymetman et al. |
| 6,335,727 B1 | 1/2002 | Morishita et al. |
| 6,340,119 B2 | 1/2002 | He et al. |
| 6,396,598 B1 | 5/2002 | Kashiwagi et al. |
| 6,408,330 B1 | 6/2002 | DeLaHuerga |
| 6,441,920 B1 | 8/2002 | Smith |
| 6,479,768 B1 | 11/2002 | How |
| 6,492,981 B1 | 12/2002 | Stork et al. |
| 6,517,266 B2 | 2/2003 | Saund |
| 6,522,928 B2 | 2/2003 | Whitehurst et al. |
| 6,529,638 B1 | 3/2003 | Westerman |
| 6,532,152 B1 | 3/2003 | White et al. |
| 6,538,187 B2 | 3/2003 | Beigi |
| 6,546,136 B1 | 4/2003 | Hull |
| 6,551,357 B1 | 4/2003 | Madduri |
| 6,560,741 B1 | 5/2003 | Gerety et al. |
| 6,570,104 B1 | 5/2003 | Ericson et al. |
| 6,570,997 B2 | 5/2003 | Noguchi |
| 6,573,887 B1 | 6/2003 | O'Donnell, Jr. |
| 6,577,299 B1 | 6/2003 | Schiller et al. |
| 6,580,424 B1 | 6/2003 | Krumm |
| 6,584,052 B1 | 6/2003 | Phillips et al. |
| 6,585,154 B1 | 7/2003 | Ostrover et al. |
| 6,592,039 B1 | 7/2003 | Smith et al. |
| 6,603,464 B1 | 8/2003 | Rabin |
| 6,625,313 B1 | 9/2003 | Morita et al. |
| 6,628,267 B2 | 9/2003 | Karidis et al. |
| 6,650,320 B1 | 11/2003 | Zimmerman |
| 6,655,597 B1 | 12/2003 | Swartz et al. |
| 6,661,920 B1 | 12/2003 | Skinner |
| 6,663,008 B1 | 12/2003 | Pettersson et al. |
| 6,671,386 B1 | 12/2003 | Shimizu et al. |
| 6,674,427 B1 | 1/2004 | Pettersson et al. |
| 6,681,045 B1 | 1/2004 | Lapstun et al. |
| 6,686,910 B2 | 2/2004 | O'Donnell, Jr. |
| 6,689,966 B2 | 2/2004 | Wiebe |
| 6,693,615 B2 | 2/2004 | Hill et al. |
| 6,697,056 B1 | 2/2004 | Bergelson et al. |
| 6,728,000 B1 | 4/2004 | Lapstun et al. |
| 6,729,543 B1 | 5/2004 | Arons et al. |
| 6,731,271 B1 | 5/2004 | Tanaka et al. |
| 6,732,927 B2 | 5/2004 | Olsson et al. |
| 6,738,053 B1 | 5/2004 | Borgstrom et al. |
| 6,744,967 B2 | 6/2004 | Kaminski et al. |
| 6,752,317 B2 | 6/2004 | Dymetman et al. |
| 6,760,009 B2 | 7/2004 | Omura et al. |

| | | | | | | |
|---|---|---|---|---|---|---|
| 6,783,069 B1 | 8/2004 | Hecht et al. | | 7,486,823 B2 | 2/2009 | Wang et al. |
| 6,819,776 B2 | 11/2004 | Chang | | 7,502,508 B2 | 3/2009 | Wang et al. |
| 6,831,273 B2 | 12/2004 | Jenkins et al. | | 2001/0038383 A1 | 11/2001 | Ericson et al. |
| 6,832,724 B2 | 12/2004 | Yavid et al. | | 2001/0053238 A1 | 12/2001 | Katsura et al. |
| 6,834,081 B2 | 12/2004 | Kim et al. | | 2002/0028018 A1 | 3/2002 | Hawkins et al. |
| 6,834,195 B2 | 12/2004 | Brandenberg et al. | | 2002/0031622 A1 | 3/2002 | Ippel et al. |
| 6,834,337 B1 | 12/2004 | Mitchell et al. | | 2002/0048404 A1 | 4/2002 | Fahraeus et al. |
| 6,847,356 B1 | 1/2005 | Hasegawa et al. | | 2002/0050982 A1 | 5/2002 | Ericson |
| 6,856,712 B2 | 2/2005 | Fauver et al. | | 2002/0069220 A1 | 6/2002 | Tran |
| 6,862,371 B2 | 3/2005 | Mukherjee | | 2002/0163511 A1 | 11/2002 | Sekendur |
| 6,864,880 B2 | 3/2005 | Hugosson et al. | | 2002/0179717 A1 | 12/2002 | Cummings et al. |
| 6,865,325 B2 | 3/2005 | Ide et al. | | 2003/0001020 A1 | 1/2003 | Kardach |
| 6,870,966 B1 | 3/2005 | Silverbrook et al. | | 2003/0009725 A1 | 1/2003 | Reichenbach |
| 6,879,731 B2 | 4/2005 | Kang et al. | | 2003/0030638 A1 | 2/2003 | Astrom et al. |
| 6,880,124 B1 | 4/2005 | Moore | | 2003/0034961 A1 | 2/2003 | Kao |
| 6,880,755 B2 * | 4/2005 | Gorbet et al. ............... 235/454 | | 2003/0050803 A1 | 3/2003 | Marchosky |
| 6,897,854 B2 | 5/2005 | Cho et al. | | 2003/0081000 A1 | 5/2003 | Watanabe et al. |
| 6,898,297 B2 | 5/2005 | Katsura et al. | | 2003/0088781 A1 | 5/2003 | ShamRao |
| 6,919,892 B1 | 7/2005 | Cheiky et al. | | 2003/0090475 A1 | 5/2003 | Paul et al. |
| 6,929,183 B2 | 8/2005 | Pettersson | | 2003/0117378 A1 | 6/2003 | Carro |
| 6,933,933 B2 | 8/2005 | Fleming | | 2003/0118233 A1 | 6/2003 | Olsson |
| 6,935,562 B2 * | 8/2005 | Hecht et al. ................. 235/454 | | 2003/0128194 A1 | 7/2003 | Pettersson |
| 6,938,222 B2 | 9/2005 | Hullender et al. | | 2003/0146883 A1 | 8/2003 | Zelitt |
| 6,956,968 B1 | 10/2005 | O'Dell et al. | | 2003/0159044 A1 | 8/2003 | Doyle et al. |
| 6,960,777 B2 | 11/2005 | Soar | | 2003/0179906 A1 | 9/2003 | Baker et al. |
| 6,964,483 B2 | 11/2005 | Wang et al. | | 2003/0214553 A1 | 11/2003 | Dodge |
| 6,968,083 B2 | 11/2005 | Williams et al. | | 2003/0214669 A1 | 11/2003 | Saitoh |
| 6,970,183 B1 | 11/2005 | Monroe | | 2004/0032393 A1 | 2/2004 | Brandenberg et al. |
| 6,975,334 B1 | 12/2005 | Barrus | | 2004/0046744 A1 | 3/2004 | Rafii et al. |
| 6,976,220 B1 | 12/2005 | Lapstun et al. | | 2004/0085302 A1 | 5/2004 | Wang et al. |
| 6,992,655 B2 | 1/2006 | Ericson et al. | | 2004/0086181 A1 | 5/2004 | Wang et al. |
| 6,999,622 B2 | 2/2006 | Komatsu | | 2004/0090429 A1 | 5/2004 | Geaghan et al. |
| 7,003,150 B2 | 2/2006 | Trajkovi | | 2004/0128264 A1 | 7/2004 | Leung et al. |
| 7,009,594 B2 | 3/2006 | Wang et al. | | 2004/0128511 A1 | 7/2004 | Sun et al. |
| 7,012,621 B2 | 3/2006 | Crosby et al. | | 2004/0153649 A1 | 8/2004 | Rhoads et al. |
| 7,024,429 B2 | 4/2006 | Ngo et al. | | 2004/0212553 A1 | 10/2004 | Wang et al. |
| 7,036,938 B2 | 5/2006 | Wang et al. | | 2004/0233163 A1 | 11/2004 | Lapstun et al. |
| 7,048,198 B2 | 5/2006 | Ladas et al. | | 2005/0024324 A1 | 2/2005 | Tomasi et al. |
| 7,092,122 B2 | 8/2006 | Iwaki | | 2005/0044164 A1 | 2/2005 | O'Farrell et al. |
| 7,110,604 B2 | 9/2006 | Olsson et al. | | 2005/0052700 A1 | 3/2005 | Mackenzie et al. |
| 7,111,230 B2 | 9/2006 | Euchner et al. | | 2005/0104909 A1 | 5/2005 | Okamura et al. |
| 7,116,840 B2 | 10/2006 | Wang et al. | | 2005/0106365 A1 | 5/2005 | Palmer et al. |
| 7,119,816 B2 | 10/2006 | Zhang et al. | | 2005/0146518 A1 | 7/2005 | Wang et al. |
| 7,123,742 B2 | 10/2006 | Chang | | 2005/0147281 A1 | 7/2005 | Wang et al. |
| 7,133,031 B2 | 11/2006 | Wang et al. | | 2005/0193292 A1 | 9/2005 | Lin et al. |
| 7,133,563 B2 | 11/2006 | Wang et al. | | 2006/0109263 A1 | 5/2006 | Wang et al. |
| 7,136,054 B2 | 11/2006 | Wang et al. | | 2006/0123049 A1 | 6/2006 | Wang et al. |
| 7,139,740 B2 | 11/2006 | Ayala | | 2006/0182309 A1 | 8/2006 | Wang et al. |
| 7,142,197 B2 | 11/2006 | Wang et al. | | 2006/0182343 A1 | 8/2006 | Lin et al. |
| 7,142,257 B2 | 11/2006 | Callison et al. | | 2006/0190818 A1 | 8/2006 | Wang et al. |
| 7,145,556 B2 | 12/2006 | Pettersson | | 2006/0215913 A1 | 9/2006 | Wang et al. |
| 7,167,164 B2 | 1/2007 | Ericson et al. | | 2006/0242560 A1 | 10/2006 | Wang et al. |
| 7,176,906 B2 | 2/2007 | Williams et al. | | 2006/0242562 A1 | 10/2006 | Wang et al. |
| 7,190,843 B2 | 3/2007 | Wei et al. | | 2006/0242622 A1 | 10/2006 | Wang et al. |
| 7,222,799 B2 | 5/2007 | Silverbrook | | 2006/0274948 A1 | 12/2006 | Wang et al. |
| 7,225,979 B2 | 6/2007 | Silverbrook et al. | | 2007/0001950 A1 | 1/2007 | Zhang et al. |
| 7,262,764 B2 | 8/2007 | Wang et al. | | 2007/0003150 A1 | 1/2007 | Xu et al. |
| 7,263,224 B2 | 8/2007 | Wang et al. | | 2007/0041654 A1 | 2/2007 | Wang et al. |
| 7,289,103 B2 | 10/2007 | Lapstun et al. | | 2007/0042165 A1 | 2/2007 | Wang et al. |
| 7,292,370 B2 | 11/2007 | Iwaki | | 2008/025612 A1 | 1/2008 | Wang et al. |
| 7,293,240 B2 | 11/2007 | Lapstun et al. | | 2009/0027241 A1 | 1/2009 | Wang |
| 7,295,193 B2 | 11/2007 | Fahraeus | | 2009/0067743 A1 | 3/2009 | Wang et al. |
| 7,330,605 B2 | 2/2008 | Wang et al. | | | | |
| 7,386,191 B2 | 6/2008 | Wang et al. | | FOREIGN PATENT DOCUMENTS | | |
| 7,400,777 B2 | 7/2008 | Wang et al. | | | | |
| 7,403,658 B2 | 7/2008 | Lin et al. | | CN | 1352778 | 6/2002 |
| 7,421,439 B2 | 9/2008 | Wang et al. | | CN | 3143455 | 9/2003 |
| 7,430,497 B2 | 9/2008 | Wang et al. | | CN | 200610092487 | 9/2003 |
| 7,440,134 B2 | 10/2008 | Natori | | EP | 0407734 | 1/1991 |
| 7,440,583 B2 | 10/2008 | Tohne et al. | | EP | 0439682 | 8/1991 |
| 7,463,784 B2 | 12/2008 | Kugo | | EP | 0564708 | 10/1993 |
| 7,477,784 B2 | 1/2009 | Wang et al. | | EP | 0670555 | 9/1995 |
| 7,486,822 B2 | 2/2009 | Wang et al. | | EP | 0694870 | 1/1996 |

| | | |
|---|---|---|
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |
| JP | 04253087 | 9/1992 |
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO 9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-03038741 | 5/2003 |
| WO | WO-2005106638 | 11/2005 |

OTHER PUBLICATIONS

U.S. Appl. No. 11/067,193, filed Feb. 25, 2005, Yang, et al.
U.S. Appl. No. 12/138,339, filed Jun. 12, 2008, Wang, et al.
U.S. Appl. No. 12/180,484, filed Jul. 25, 2008, Wang.
"VPEN, Revolutionizing Human Interaction With The Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "Thingss That See," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler Number of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. EP 05000170.0-1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 Pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development Of Pen-Shaped Scanners," Nec, vol. 51, No. 10, 1998.
Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
Hecht, D.L., "Printed embedded data graphical user interfaces," Computer vol. 34, Issue 3, Mar. 2001, pp. 47-55.
IEEExplore # Search Session History, May 7, 2008, http://ieee.org/search/history.jsp, 1 page.
International Search Report for Application No.: PCT/US2006/032230; Applicant: Microsoft Corporation; Date of Mailing: Jan. 9, 2007 (3 pages).
Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2003.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen to Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "N-Scribe For Digital Writing," Flash Commerce News, http://flashcommerce.com/articles/, dated Sep. 5, 2003.
Internet Print Out: "N-Scribe For Digital Writing," Mobileinfo.com, News issue #2001—15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul. 15, 2002.

Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.

Internet Print Out: "Preprocessing in the Npen++ System," http://www.is.cs.cmu.edu/mie/multimodal_npen_preproc.html, dated Aug. 8, 2002.

Internet Print Out: "RF Pen Sends Your Scribbles," Appliance Manufacturing Magazine, http://www.ammagazine.com. Dated Sep. 26, 2002.

Internet Print Out: "SMART Board Interactive Whiteboard," Smarttech, http://www.smarttech.com, pp. 1-26, Sep. 5, 2003.

Internet Print Out: "The Hot New Medium: Paper—How The Oldest Interface In The Book is Redrawing The Map Of The Networked World," http://www.wired.com/wired/, dated Sep. 5, 2003.

Internet Print Out: "Anoto functionality," News, dated Jul. 15, 2002.

Internet Print Out: "Anoto functionality," Showroom, dated Jul. 15, 2002.

Internet Print Out: "ChatPen CHA-30," Digital Pens, Anoto Functionality, dated Jul. 15, 2002.

Internet Print Out: "Cintiq18SX—A Powerful New Way to Work Directly On The Screen," Wacom Technology, Cintiq-Interactive Pen Display, dated Sep. 5, 2003.

Internet Print Out: "Communicate Digitally With Ordinary Pen and Paper," Anoto Functionality, dated Jul. 15, 2002.

Internet Print Out: "Creating A Global De Facto Standard," Anoto Functionality, dated Jul. 15, 2002.

Internet Print Out: "Daily News," dated Aug. 15, 2002.

Internet Print Out: "Digital Pens and Technical Data," Anoto Functionality, dated Jul. 15, 2002.

Internet Print Out: "Downloads," Anoto Functionality, dated Jul. 15, 2002.

Internet Print Out: "Optical Translation Measurement (OTM™)," Technologies, dated Jul. 15, 2002.

Internet Print Out: "Partners Supporting Anoto Functionality," Anoto Functionality, dated 15, 2002.

Internet Print Out: "Possibilities," Anoto Functionality, dated Jul. 15, 2002.

Internet Print Out: "Product VPen™," OTM Technologies, dated Jul. 15, 2002.

Internet Print Out: "Products—Get Everyone On The Same Page," Mimio, dated Sep. 5, 2003.

Internet Print Out: "Sensor Board and Pen," Wacom, Product, dated Jul. 15, 2002.

Internet Print Out: "The Solution," Anoto Functionality, dated Jul. 15, 2002.

Internet Print Out: "Vision and Mission," Anoto Functionality, dated Jul. 15, 2002.

Internet Print Out: "Wacom Displays Pressure-Sensitive Pen Sensor for Tablet PCs," Wacom, News, dated Jul. 15, 2002.

Internet Print Out: "Welcome To www.anoto.com," Anoto, dated Jul. 15, 2002.

Internet Printout—http://www.anoto.com: Construction, Sep. 5, 2003.

Internet Printout—http://www.anoto.com: Page template, Sep. 5, 2003.

Internet Printout—http://www.anoto.com: Paper and Printing, Sep. 5, 2003.

Internet Printout—http://www.anoto.com: Paper space, Sep. 5, 2003.

Internet Printout—http://www.anoto.com: Pattern, Sep. 5, 2003.

Internet Printout—http://www.anoto.com: Printers supporting Anoto functionality, Sep. 5, 2003.

Internet Printout—http://www.anotofunctionality.com: Anoto Functionality—Anoto pattern & digital paper, Sep. 26, 2002.

Internet Printout—http://www.anotofunctionality.com: Anoto Functionality—Anoto pattern & digital paper, Sep. 5, 2003.

Internet Printout—http://www.anotofunctionality.com: Anoto Functionality—Applications, Sep. 5, 2003.

Internet Printout—http://www.anotofunctionality.com: Anoto Functionality—Corporate applications, Sep. 5, 2003.

Internet Printout—http://www.anotofunctionality.com: Anoto Functionality—Digital notes, Sep. 5, 2003.

Internet Printout—http://www.anotofunctionality.com: Anoto Functionality—Digital paper, Sep. 26, 2002.

Internet Printout—http://www.anotofunctionality.com: Anoto Functionality—Digital paper, Sep. 5, 2003.

Internet Printout—http://www.anotofunctionality.com: Anoto Functionality—Digital pens Use with mobile phones, Sep. 5, 2003.

Internet Printout—http://www.anotofunctionality.com: Anoto Functionality—Digital Pens Use with personal computers, Sep. 26, 2002.

Internet Printout—http://www.anotofunctionality.com: Anoto Functionality—Digital Pens, Sep. 26, 2002.

Internet Printout—http://www.anotofunctionality.com: Anoto Functionality—Digital pens, Sep. 5, 2003.

Internet Printout—http://www.anotofunctionality.com: Anoto Functionality—Digital service, Sep. 26, 2002.

Internet Printout—http://www.anotofunctionality.com: Anoto Functionality—Digital service, Sep. 5, 2003.

Internet Printout—http://www.anotofunctionality.com: Anoto Functionality—E-mail, Sep. 5, 2003.

Internet Printout—http://www.anotofunctionality.com: Anoto Functionality—Fax, Sep. 5, 2003.

Internet Printout—http://www.anotofunctionality.com: Anoto Functionality—Freedom of expression, Sep. 26, 2002.

Internet Printout—http://www.anotofunctionality.com: Anoto Functionality—Graphical SMS, Sep. 5, 2003.

Internet Printout—http://www.anotofunctionality.com: Anoto Functionality—Hints & tips Using your digital paper, Sep. 5, 2003.

Internet Printout—http://www.anotofunctionality.com: Anoto Functionality—Hints & tips Using your digital pen, Sep. 5, 2003.

Internet Printout—http://www.anotofunctionality.com: Anoto Functionality—Hints & tips Using Your Digital Service, Sep. 5, 2003.

Internet Printout—http://www.anotofunctionality.com: Anoto Functionality—Hints & tips, Sep. 5, 2003.

Internet Printout—http://www.anotofunctionality.com: Anoto Functionality—How does it work?, Sep. 26, 2002.

Internet Printout—http://www.anotofunctionality.com: Anoto Functionality—Security, Sep. 5, 2003.

Internet Printout—http://www.anotofunctionality.com: Anoto Functionality—Software and additionals, Sep. 5, 2003.

Internet Printout—http://www.anotofunctionality.com: Anoto Functionality—What is Anoto functionality?, Sep. 5, 2003.

Internet Printout—http://www.anotofunctionality.com: Anoto Functionality—You to an organization, Sep. 26, 2002.

Internet Printout—http://www.anotofunctionality.com: Anoto Functionality—You to someone else, Sep. 26, 2002.

Internet Printout—http://www.anotofunctionality.com: Anoto Functionality—You to yourself, Sep. 26, 2002.

Internet Printout—http://www.anotofunctionality.com: Anoto® functionality brings digital life to paper products, Sep. 5, 2003.

Internet Printout—http://www.edgereview.com: The Edge—First Look: Digital Ink n-scribe, Sep. 5, 2003.

Internet Printout—http://www.flashcommerce.com: n-scribe for Digital Writing, Sep. 5, 2003.

Internet Printout—http://www.gizmo.com: Maxell Digital Pen to use Anoto system, Sep. 5, 2003.

Internet Printout—http://www.is.cs.cmu.edu: Final input representation, Aug. 8, 2002.

Internet Printout—http://www.is.cs.cmu.edu: Npen++, Aug. 8, 2002.

Internet Printout—http://www.mimio.com: Capture, Save and Share, Sep. 5, 2003.

Internet Printout—http://www.mimio.com: Mimio technology, Sep. 5, 2003.

Internet Printout—http://www.mimio.com: Turn your whiteboard into an interactive whiteboard, Sep. 5, 2003.

Internet Printout—http://www.pcmag.com: Jot This, Sep. 5, 2003.

Internet Printout—http://www.smarttech.com: Carnegie Mellon research ranks the Smart Board™ interactive whiteboard as fastest, most accurate way to interact with projected information, Sep. 5, 2003.

Internet Printout—http://www.smarttech.com: Smart Board Interactive Whiteboard—Front Projection Features, Sep. 5, 2003.

Internet Printout—http://www.smarttech.com: Smart Board Interactive Whiteboard—Q&A, Sep. 5, 2003.

Internet Printout—http://www.smarttech.com: Smart Board Interactive Whiteboard, Sep. 5, 2003.

Internet Printout—http://www.smarttech.com: Smart Camfire™, whiteboard camera system effortlessly saves dry-erase whiteboard notes, Sep. 5, 2003.

Internet Printout—http://www.smarttech.com: Smart Technologies Inc. awarded another U.S. patent for touch sensitive Smart Board™ technology, Sep. 5, 2003.

Internet Printout—http://www.smarttech.com: Smart Technologies, Inc. Press Releases, Sep. 5, 2003.

Internet Printout—http://www.smarttech.com: Smart Technologies, Inc., New annotation and software functionality on all Smart Board™ Interactive Whiteboards, Sep. 5, 2003.

Internet Printout—http://www.smarttech.com: What's New, Sep. 5, 2003.

Internet Printout—http://www.smarttech.com: Press Releases—Smart launches Research Assistance Program, Sep. 5, 2003.

Internet Printout—http://www.smarttech.com: Smart Board Interactive Whiteboard Profiles—Sep. 5, 2003.

Internet Printout—http://www.smarttech.com: Smart Board Software Features—Sep. 5, 2003.

Internet Printout—http://www.tabletpccorner.com: Anoto Pen Bluetooth, Sep. 5, 2003.

Internet Printout—http://www.techtv.com: Nscribe Pen and Presenter-to-Go, Sep. 5, 2003.

Internet Printout—http://www.wacom.com: Cintiq—Interactive Pen Display, Sep. 5, 2003.

Internet Printout—http://www.wacom.com: Graphire2—Have more fun with digital phones, Sep. 5, 2003.

Internet Printout—http://www.wacom.com: Intuos2—The Professional Tablet, Sep. 5, 2003.

Internet Printout—http://www.wacom.com: intuos2, Sep. 5, 2003.

Internet Printout—http://www.wacom.com: Penabled Wacom, Sep. 5, 2003.

Internet Printout—http://www.wacom.com: tablet PC, Sep. 5, 2003.

Internet Printout—http://www.wired.com: The Hot New Medium: Paper, Sep. 5, 2003.

Jelinek, Frederic, "Statistical Methods for Speech Recognition," The MIT Press, pp. 1-283, 2001.

Ko et al., "Finger Mouse and Gesture Recognition System As A New Human Computer Interface," Computer and Graphics, Col. 21, No. 5, pp. 555-561, 1997.

Lau, R., "Adaptive Statistical Language Modeling," Submitted to the Dept. of Electrical Engineering and Computer Science in Partial Fulfillment for the Degree of Master of Science at the MIT, May 1994.

Lee, Kai-Fu, "Automatic Speech Recognition—The Development of the SPHINX System," Kluwer Academic Publishers, pp. 1-207, 1992.

Moran, et al., "Design and Technology for Collaborage: Collaborative Collages of Information on Physical Walls," Nov. 1999.

Munich, M.E.; Perona, P., "Visual Input for Pen-Based Computers," Image Processing, 1996, Proceedings International Conference on Sep. 16-19, 1996. Volume 1, pp. 173-176.

Nathan, K.S. et al., "On-Line Handwriting Recognition Using Continuous Parameter Hidden Markov Models," 1993 IEEE.

Okad, et al. "A Method for Document Digitizer by Real Time Assembling of Mosaic Pictures," Scripta Publishing Co., Systems, Computers, Controls, vol. 13, No. 5, Sep. 1982, pp. 74-80.

Okada et al., "A High-Resolution Handwriting Character Input Device Using Laser Beams," Department of Instrumentation Engineering, Faculty of Science and Technology, vol. 10.4, No. 11.1, 1981.

Otsu, Nobuyuki, "A Threshold Selection Method From Gray-Level Histogram," IEEE Transactions on Systems, Man, And Cybemetics; Jan. 1979, vol. SMC-9, No. 1, pp. 62-66.

Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.

Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.

Sato et al., "Novel device for Inputting Handwriting Trajectory," RICOH Technical Report No. 27, Nov. 2001, pp. 52-59, http://www.ricoh.co.jp/rdc/techreport/No27/Ronbun/A2707.pdf.

Sato et al., "Video Tablet—2D Coordinate Input Device With OCD Camera," Osaka University, vol. J67-D, No. 6, Jun. 1984.

Shum, Heung-Yeung, et al., "Panoramic Image Mosaics," Microsoft Research Technical Report MSR-TR-97-23, 1997, 53 pages.

Tang, Xiaoou et al., "Video-based handwritten Chinese character recognition," Circuits and Systems for Video Technology, IEEE Transactions, Jan. 2005, vol. 15, Issue 1, pp. 167-174.

Urbanski, Brian, "Don't Break This Ink Pen," Edgereview.com, http://www.edgereview.com/ataglance.cfm?category=edge&ID=180, dated Jul. 15, 2002.

Urbanski, Brian, "Don't Break This Ink Pen," Edgereview.com, http://www.edgereview.com/ataglance.cfm?category=edge&ID=180, dated Sep. 5, 2003.

Louderback, Jim, "Nscribe pen And Presenter-To-Go- Infrared Pen and New Springboard Module Make Their Debut At Demo 2001," Edgereview.com, http://www.techtv.com/freshgear.pr, dated Sep. 5, 2003.

Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

\* cited by examiner

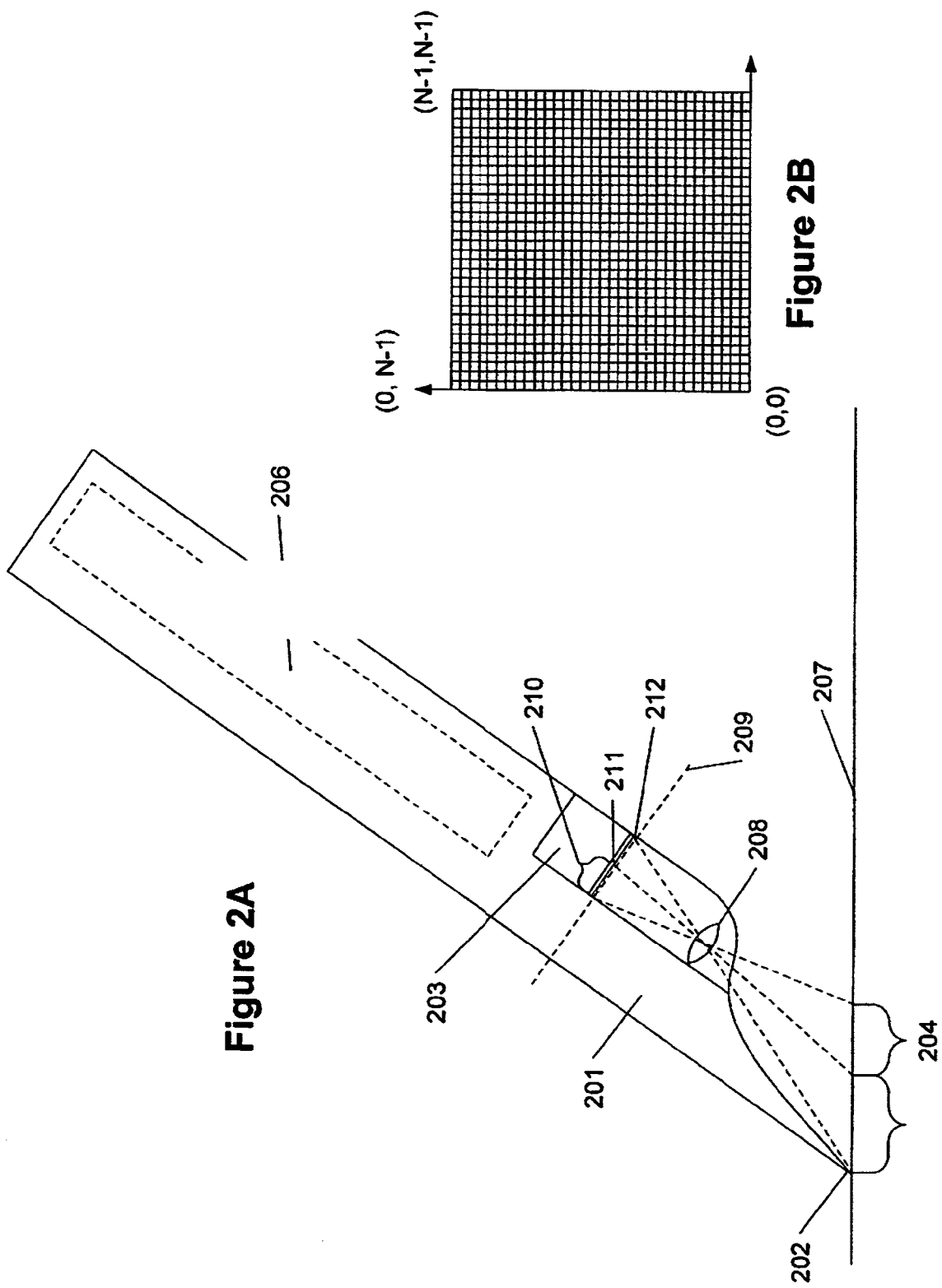

Figure 3A  0111 0000 0101 1101 1001 0111 1111 1000 1010
Figure 3B  0101011110 110110010 001010011 111101100
Figure 3C  0101 1101 0011 1101 1001 1001 1110 0010
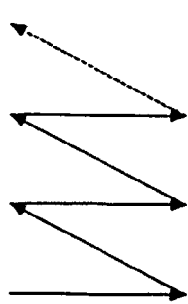
Figure 3D
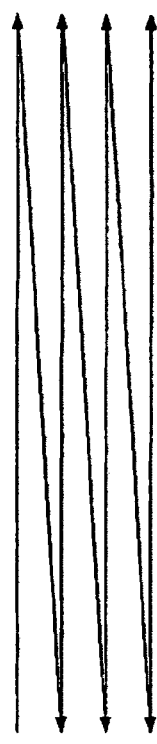
Figure 3E
Figure 3F

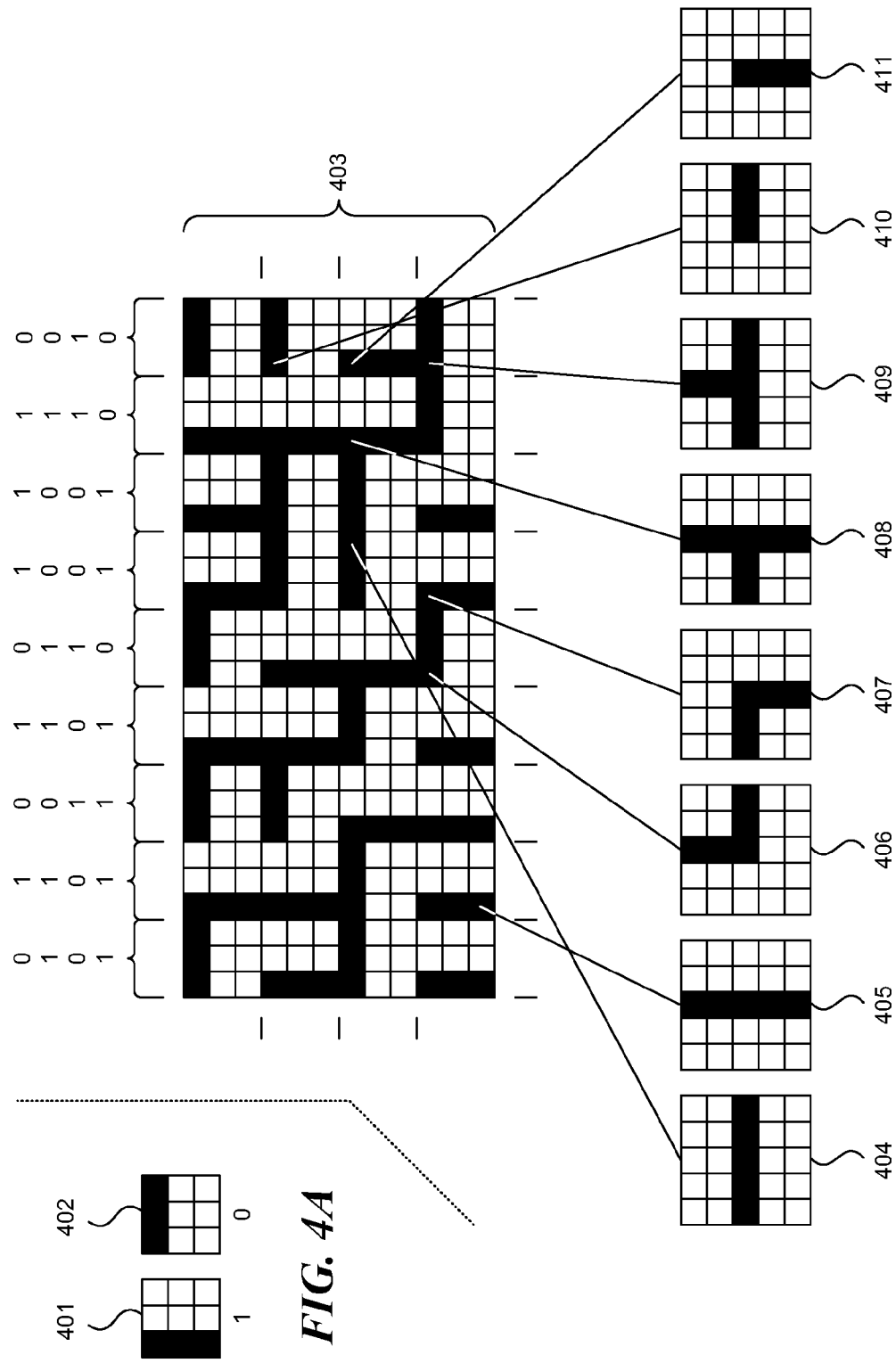

  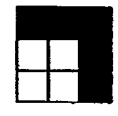 
Figure 5A  Figure 5B  Figure 5C  Figure 5D
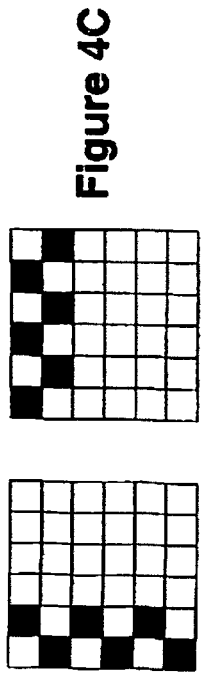
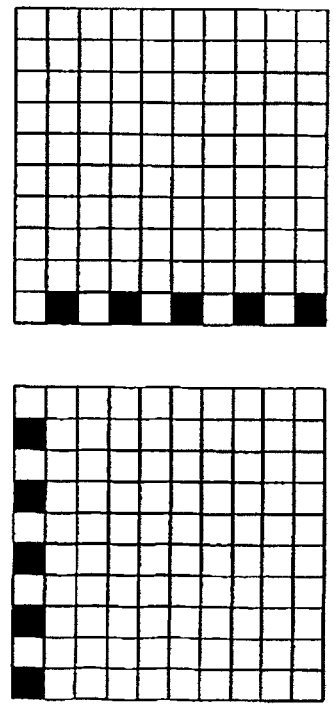
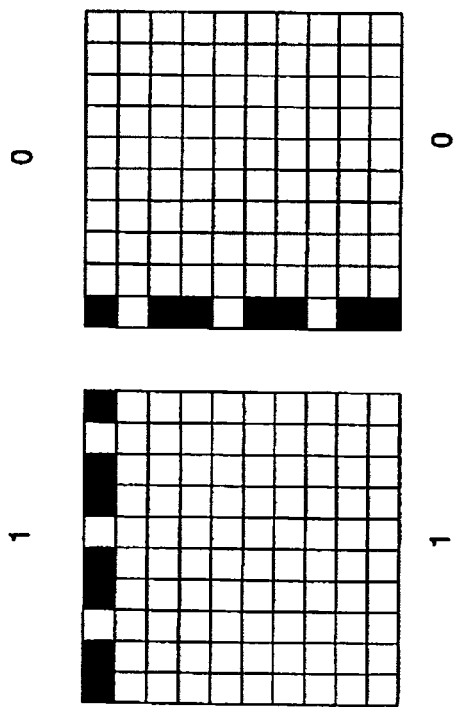
Figure 4C
Figure 4D
Figure 4E $$o = \theta + \begin{cases} 0 - no\ a \\ \dfrac{\pi}{2} - no\ b \\ \pi - no\ c \\ \dfrac{3\pi}{2} - no\ d \end{cases}$$

DECODING AND ERROR CORRECTION IN 2-D ARRAYS

CROSS REFERENCE TO RELATED APPLICATIONS

The present application is a continuation of U.S. patent application Ser. No. 11/470,338, filed Sep. 6, 2006, entitled "DECODING AND ERROR CORRECTION IN 2-D ARRAYS," which application is a divisional of U.S. patent application Ser. No. 10/284,422, filed Oct. 31, 2002, now U.S. Pat. No. 7,116,840, both of which are incorporated herein by reference in their entireties.

TECHNICAL FIELD

The present invention relates to interacting with a medium using a digital pen. More particularly, the present invention relates to determining the location of a digital pen during interaction with one or more surfaces.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides efficient decoding of the captured image.

SUMMARY

Aspects of the present invention provide solutions to at least one of the issues mentioned above, thereby enabling one to locate a position or positions on a viewed image. The viewed image may be on a printed image or may be a graphical representation on a displayed computer image. Aspects of the present invention include a decoding process that permits efficient decoding of a captured image, providing for efficient determination of the location of the image. These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

DETAILED DESCRIPTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, and location determination.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
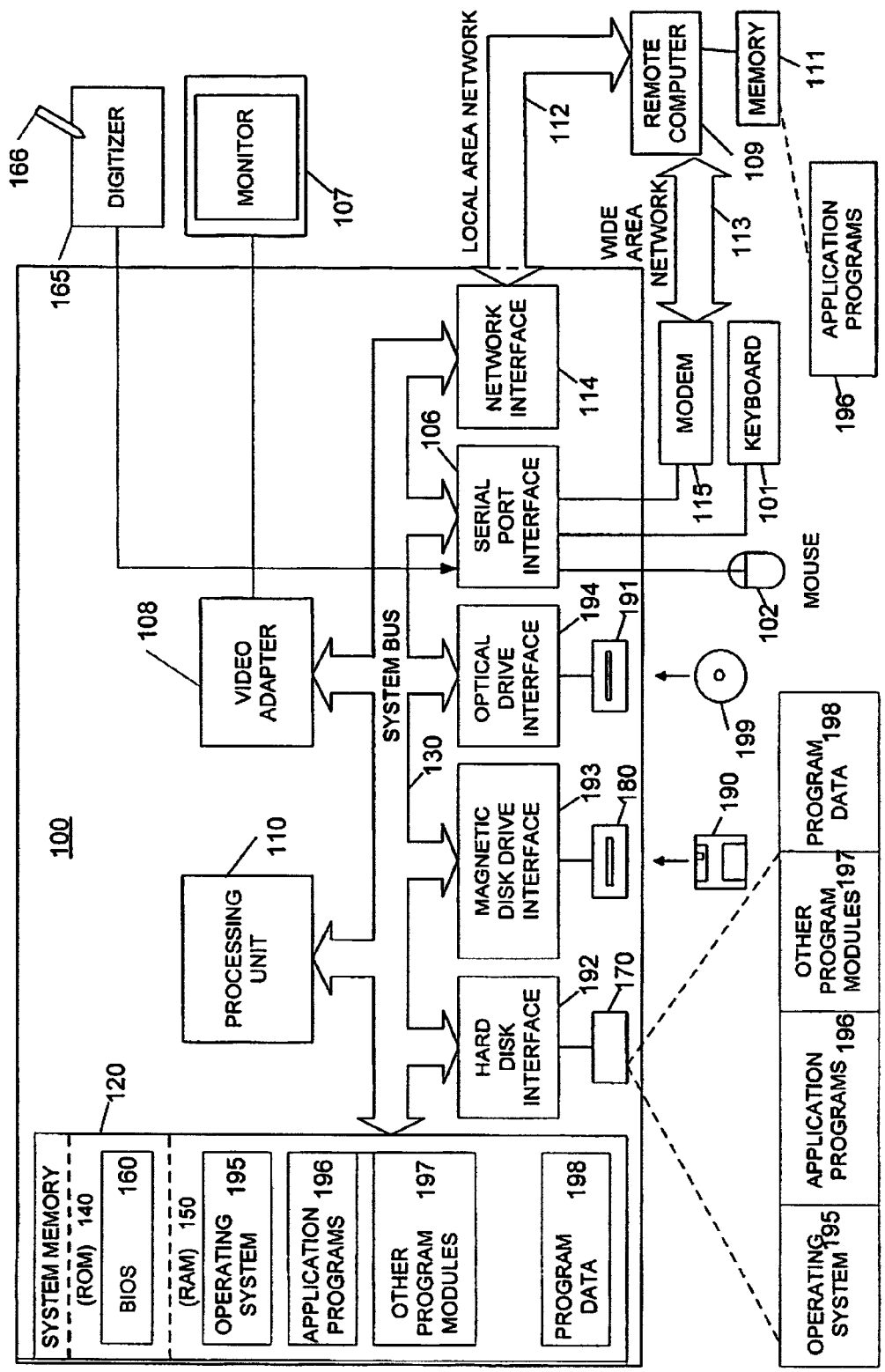
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical graphical image on the paper or a graphical image overlying the displayed image or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames {Ii}, i=1, 2, ..., A, where Ii is captured by the pen 201 at sampling time ti. The sampling rate may be fixed or may be variable based on the size of the document. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual-pentip}$) to the location of the real pen tip 202 (represented by $L_{pentip}$), one can determine the location of the real pen tip in relation to a captured image 210.

The following transformation $F_{S \rightarrow P}$ transforms the image captured by camera to the real image on the paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \rightarrow P}$ may be referred to as a perspective transformation. This simplifies as:

$$F'_{S \rightarrow P} = \begin{Bmatrix} s_x \cos\theta, & s_y \sin\theta, & 0 \\ -s_x \sin\theta, & s_y \cos\theta, & 0 \\ 0, & 0, & 1 \end{Bmatrix}$$

as the estimation of $F_{S \rightarrow P}$, in which $\theta$, $s_x$, and $s_y$ are the rotation and scale of two orientations of the pattern captured at location 204. Further, one can refine $F'_{S \rightarrow P}$ to $F_{S \rightarrow P}$ by matching the captured image with the corresponding background image on paper. "Refine" means to get a more precise perspective matrix $F_{S \rightarrow P}$ (8 parameters) by a kind of optimization algorithm referred to as a recursive method. The recursive method treats the matrix $F'_{S \rightarrow P}$ as the initial value. $F_{S \rightarrow P}$ describes the transformation between S and P more precisely than $F'_{S \rightarrow P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \rightarrow P}$. From this transform, one can obtain the location of the virtual image of pen tip $L_{virtual-pentip}$:

$$L_{virtual-pentip} = F_{P \rightarrow S}(L_{pentip})$$

And, $$F_{P \rightarrow S} = 1/F_{S \rightarrow P}$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \rightarrow P}$ from image captured. Finally, one can use this information to determine the location of the real pen tip $L_{pentip}$:

$$L_{pentip} = F_{S \rightarrow P}(L_{virtual-pentip})$$

Encoding of Array

A two-dimensional array may be constructed by folding a one-dimensional sequence. Any portion of the two-dimensional array may be used to determine its location in complete two-dimensional array. One concern is that the image portion captured by a camera is limited in size. Accordingly, one needs to be able to determine the location from the captured image or a few captured images. Additional complications arise in that errors present in the captured image may compromise the availability of some points in the captured image. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and where p is a prime number. The sequence or m-sequence may be generated by a variety of different techniques including, but not limited to, polynomial division. Using polynomial division, the sequence may be defined as follows:

$$\frac{R_l(x)}{P_n(x)} \qquad (1)$$

where Pn(x) is a primitive polynomial of degree n in field $F_q[x]$ (having q elements). $R_l(x)$ is a nonzero polynomial of degree l (where l<n) in field $F_q[x]$. The sequence may be created used an iterative procedure using two steps: first, dividing the two polynomials (resulting in an element of field Fq) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_I(x)$: changing $R_I(x)$ only cyclically shifts the sequence and every cyclical shifting corresponds to a polynomial $R_I(x)$. One of the properties of the resulting sequence is that, over a width (or length) n, any portion exists once in the sequence.

The process described above is but one of a variety of processes that may be used to create a non-repeating sequence.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1, l) = A(k, l+m_2) = A(k, l)$. When an $n_1 \times n_2$ window shifts through a period of A, all the nonzero $n_1 \times n_2$ matrices over $F_q$ appear once and only once. This property may be referred to as a "window property" in that each window is unique. A may then be expressed as an array of period (m1,m2) (with $m_1$ and $m_2$ being the horizontal and vertical number of bits present in the array) and order (n1,n2).

A binary array (or m-array) may be constructed by folding the sequence. One approach is to obtain a sequence then fold it to a size $m_1 \times m_2$ where the length of the array is $L = m_1 \times m_2 = 2^n - 1$. Alternatively, one may start with a predetermined size of the space one wants to cover (for example, one sheet of paper, 30 sheets of paper or the size of a computer monitor), determine the area $(m_1 \times m_2)$, then use the size to let and $L \geq m_1 m_2$, where $L = 2^n - 1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths FIGS. 3E and 3F. The folding method as shown in FIG. 3D may be expressed as when $\gcd(m_1, m_2) = 1$ where $L = 2^n - 1$.

To create the folding method as shown in FIG. 3D, one creates a sequence $[a_i]$ of length L and order n. Next, an array $\{b_{kl}\}$ of size $m_1 \times m_2$ is created from the sequence $\{a_i\}$ by letting each bit of the array be calculated as shown by equation 1:

$$b_{kl} = a_i \text{ where, } k = i \bmod(m_1), l = i \bmod(m_2), i = 0, \ldots, L-1. \quad (1)$$

This folding approach may be alternatively expressed as laying the sequence on the diagonal of the array, then continuing from the opposite side when an edge is reached.

Figure 11:
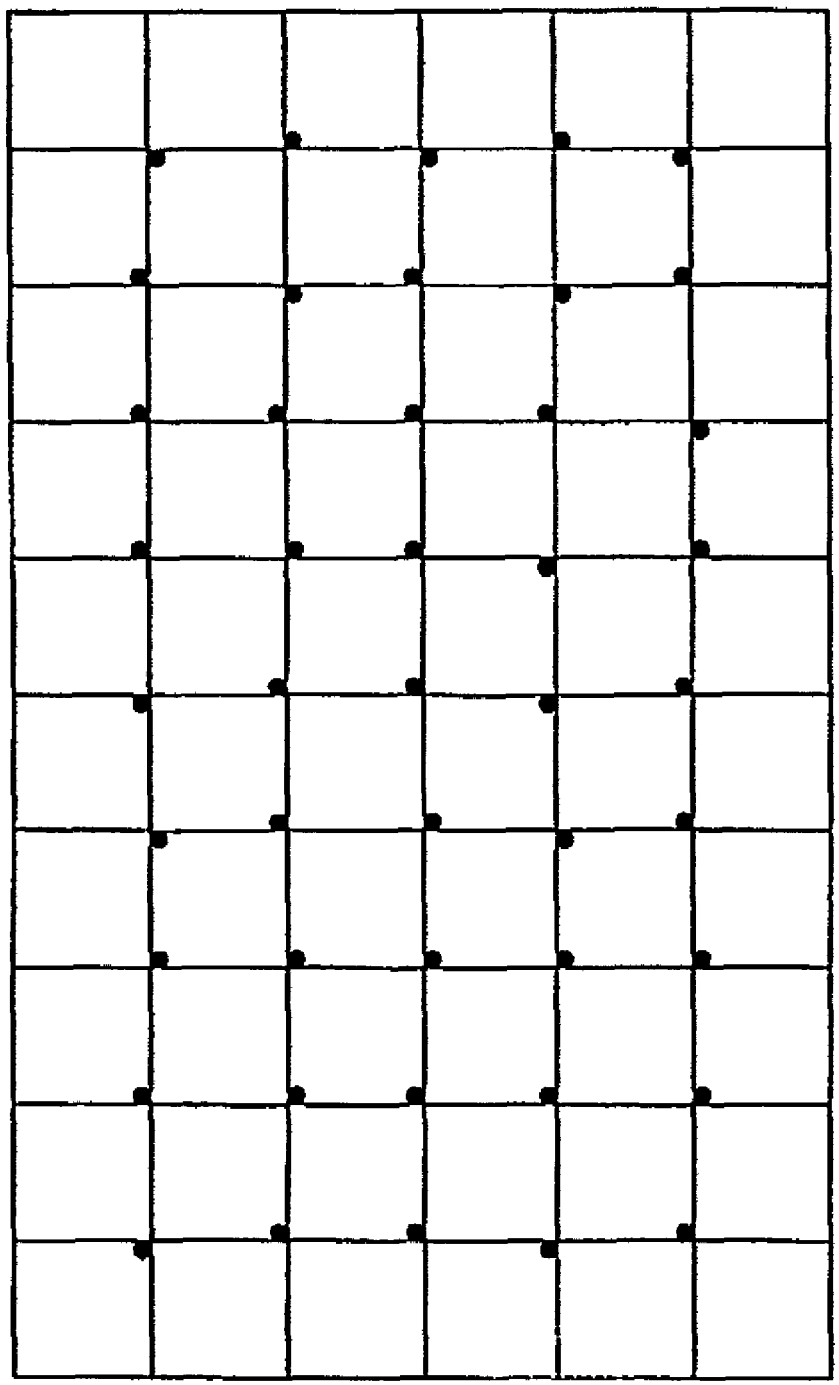
FIG. 11 shows a conventional representation of encoding space in a document.

FIG. 4A shows sample encoding techniques for a first bit and a second bit that may be used with the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E show pixel representations in columns and rows in an irregular spacing format (e.g., two dark blocks followed by a light block).

Referring back to FIG. 4A, if a bit is represented by a 3 by 3 matrix and an imaging system detects a dark row and two white rows in the 3×3 region, then a zero is represented (or a one). If an image is detected with dark column and two white columns, then a one is represented (or a zero).

Here, more than one block or pixel or dot is used to represent a bit. Using a single pixel (or block or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 10 using only space-shifted dots.

A bit stream is used to create the graphical pattern 403 of FIG. 4B. Graphical pattern 403 includes 12 rows and 18 columns. The rows and columns are formed by a bit stream being converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 1 & 1 & 1 & 0 & 1 & 1 & 0 & 0 \end{bmatrix}$$

Decoding

When a person writes with the pen of FIG. 2A or moves the pen close to the encoded pattern, the camera captures an image. The image is then processed to determine the orientation of the captured image with respect to the complete representation of the encoded image and extract the bits that make up the encoded image.

FIG. 4B includes representations of the pixel blocks from image 403. The displayed images 404-411 show 5×5 pixel blocks. Pixel block 404 shows a dark row between white rows. Pixel block 405 shows a dark column between white columns. Pixel block 406 shows a bottom left corner. Pixel block 407 shows a top right corner. The pixel block 408 shows a dark column with half a dark row on the left. Pixel block 409 shows a dark row with half a dark column above the row. The pixel block 410 shows half a dark row. Pixel block 411 shows half a dark column. Analyzing the combination of pixel blocks, one appreciates that all combinations of pixel may be formed by the image segments found in pixel blocks 404-411.

Further, one may attempt to represent all possible pixel combinations with a smaller set of pixel blocks. Without more, one would expect that each of the four blocks shown in FIGS. 5A-5D to be found in the image 403. However, only three types of corners exist in the eight pixel blocks 404-411. In this example, there is no pixel block represented as FIG. 5A. By the fact that the image segments 401 and 402 may be chosen to eliminate a type of corner, this presents the opportunity to determine the orientation of a captured image based on the missing type of corner.

Figures 6, 7:
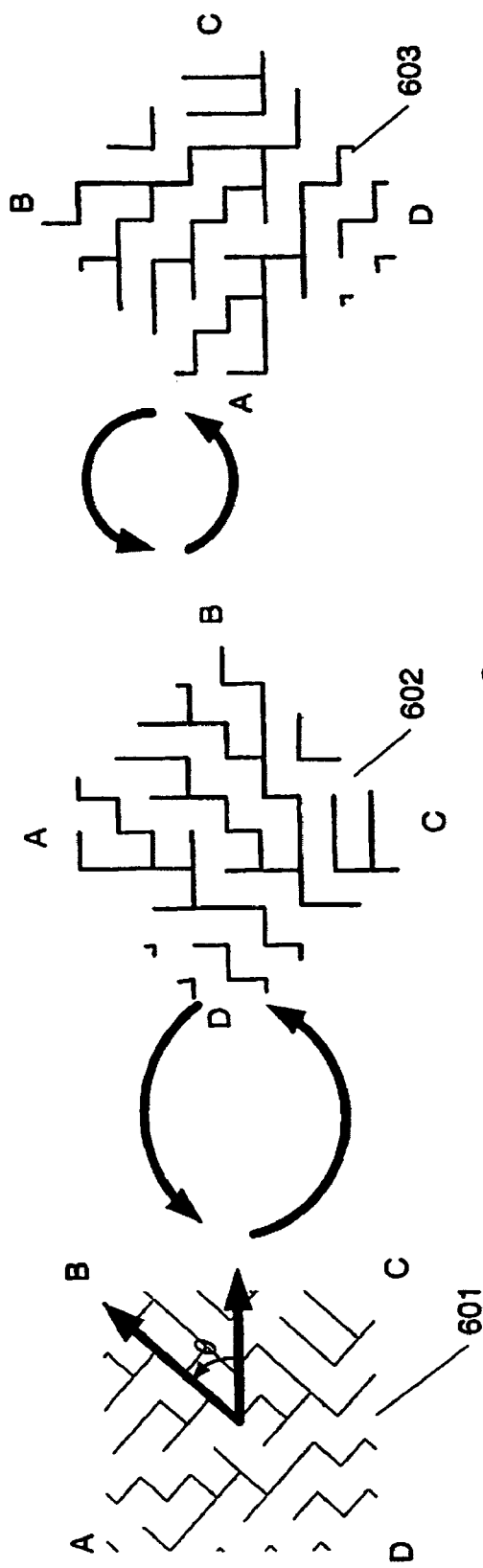
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image a captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount [defined by which corner missing]). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to present the image as 603 to set up the image for decoding. Here, the image is rotated 90 degrees counterclockwise so location of image 603 may be recovered.

It is appreciated that the rotation angle θ may be applied before or after rotation of the image 601 to account for the missing corner.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 4B). The process of determining the location of a segment of bits within the entire array is complicated by a number of items. First, the actual bits to be captured may be obscured from ideal capture by the camera (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

First, looking only at the sequence, let the sequence (or m-sequence) I correspond to the power series $I(x)=1/P_n(x)$. Also, $R(x)=r_0+r_1x+r_2x^2+ \ldots +r_{n-1}x^{n-1}$ is any nonzero polynomial whose degree is less than n. Sequence R corresponds to $R(x)/P_n(x)$. As mentioned above, R is a shifted version of I. A distance D is defined as the distance between I and R. This may be represented as $D(R)=s$ if R is the s-th shift of I. This distance D may be computed using a number of different techniques. One technique is by determining the Hamming distance between the two. Another method is by using the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568). Other distance determining techniques as known in the art may also be used. Using the Pohlig-Hellman-Silver algorithm, $R(x) \equiv x^r \mod(P_n(x))$.

However, attempting to compute a distance using the folded sequence is more complex as the codes extracted may be non-consecutive and may further include errors. Starting with the above sequence analysis, one may determine a location from an image. One may start with the following relation:

$$R = r'A \qquad (2)$$

where, $r=(r_0 \ r_1 \ r_2 \ldots r_{n-1})'$, and $A=(I \ T(I) \ldots T^{n-1}(I))'$ consists of the cyclic shifts of I. Accordingly, any cyclic shift of I is the product of r' and A. If the pen reads k bits ($b=(b_0 \ b_1 \ b_2 \ldots b_{k-1})'$ where ($k \geq n$) of I), R(x) may be used to cyclically shift $b_0$ to the beginning of the sequence (or m-sequence). This shifting then adjusts the columns of A to create an n×k sub-matrix M of A. Hence, $$r^T M = b^T. \qquad (3)$$

where T represents a translation of the matrix or vector.

If all the rows of M are independent, r may be determined and D(R) resulting in the absolute position of $b_0$ in I by modulating the one-dimensional locations of equation (1). This means that the two-dimensional location of the $b_0$ bit may be determined. This position information permits the location of the pen tip to be determined.

Next, all modulations of A may be determined and checked.

Alternatively, because matrix A is large, not all modulations of A need to be retained. In fact, in some implementations, only relative positions between the columns are relevant. Thus, the columns that may be saved (after shifting $b_0$ to the beginning of the sequence (or m-sequence)) are those whose corresponding two-dimensional positions are within the reception field of the camera when the pen (and thus the camera) rotates. The columns may be stored in an array with two-dimensional position information (e.g., a matrix). An example includes:

"element-type CoreVector [rowsize][column-size]."

The total number of such columns is much smaller than L (where $L=2^n-1$). If b is error-free, the solution of r may be expressed as:

$$r' = \tilde{b}' \tilde{M}^{-1} \qquad (4)$$

where $\tilde{M}$ is any non-degenerate n×n sub-matrix of M and $\tilde{b}$ is the corresponding sub-vector of b.

Error Correction

If errors exist in b, then the solution of r becomes more complex. If the number of errors in b (expressed as $n_e$) is less than d/2, where d is the least Hamming distance of the code generated by M, b can be corrected. Unfortunately, as the matrix M changes for different pen poses and that the structure of matrix M is not regular, traditional methods of decoding with error correction may not readily apply. In some instances, it has been suggested that it is not possible to accurately determine d when errors are present. See Ilya Dumer, Daniele Micciancio and Madhu Sudan, "Hardness of Approximating the Minimal Distance of a Linear Code", IEEE Symposium on Foundations of Computer Science. 1999, pp. 475-485.

However, positive results have been achieved using a stochastic approach. Assuming that $n_e$ is relatively small compared to k, the probability of choosing correct n bits from the k bits of b is large when randomly chosen n bits whose corresponding columns in M are independent.

The system may repeatedly select random bits in an image. If the system repeats this selection and analysis a number of times, it can generally isolate the proper distance in the sequence. In other words, when correct bits are chosen, the Hamming distance between b' and r'M will be minimal, where r is computed via equation (4). Repeated several times, the correct r will occur more times than other distances and thus can be easily identified. This result may be used alone or may be combined with previous location information. For example, if the camera captures a string of images that can be located in a line near the top of the page and the current image from the camera provides, for example, two distances from the previous string with one being very close and one being very far, it is more likely that the user only moved the pen a small amount rather than a large amount in a very short time. Other types of analyses between previous image captures and current image captures may be used.

If there are different r's such that the Hamming distance between b' and r'M are all minimal, then the probability that $n_e$ exceeds the error correcting ability of the code generated by M is large and the decoding process fails. The system then may move onto the next captured image from the camera.

Finally, the correct b may be determined and the localization of r in sequence (m-sequence) I can be computed by various techniques (including but not limited to the Pohlig-Hellman-Silver algorithm). The pen tip may then be located.

Figure 8:
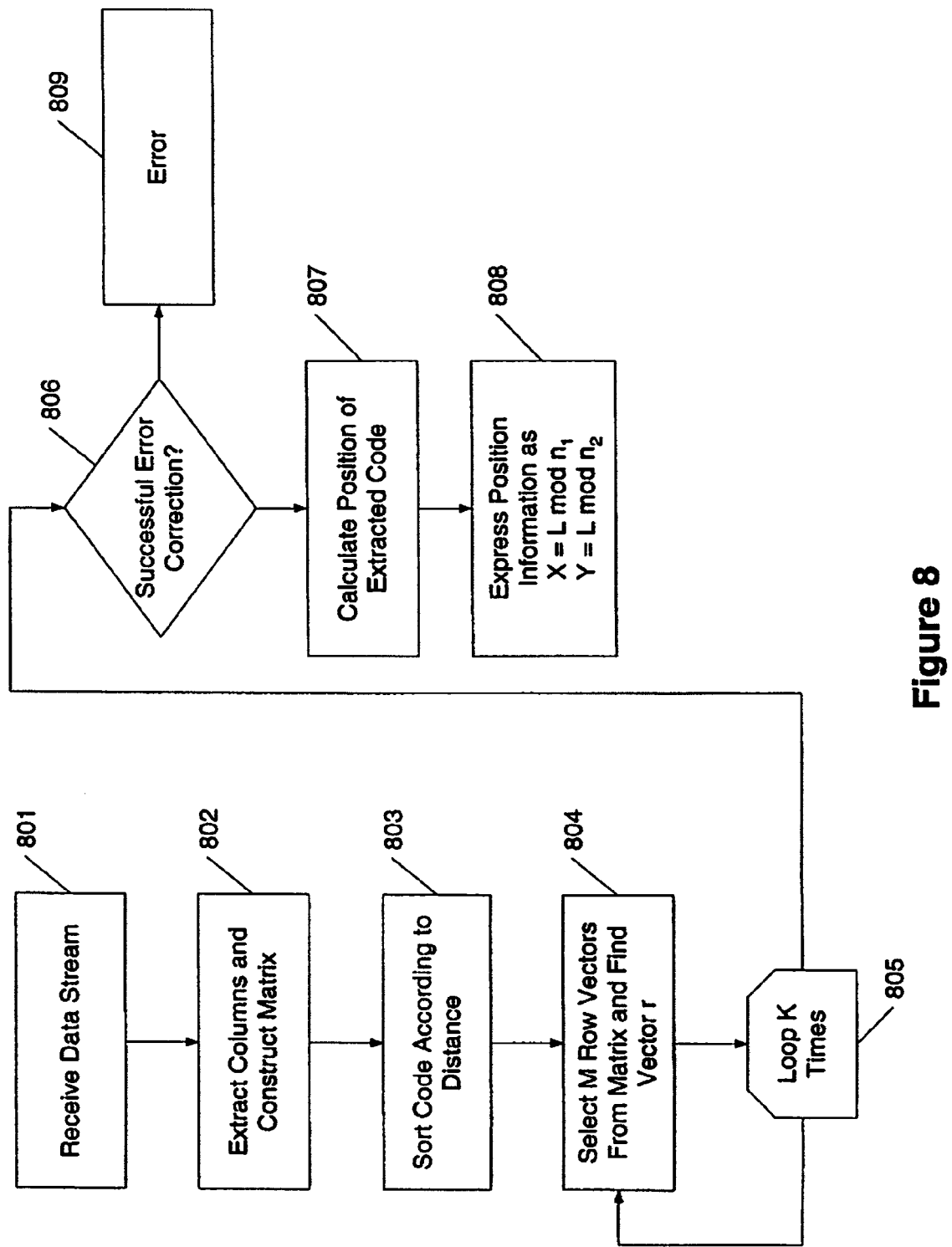
FIG. 8 shows a process for determining the location of a captured array in accordance with embodiments of the present invention.

FIG. 8 reflects a process that may be used to determine a location in a sequence (or m-sequence) of a captured image. First, in step 801, a data stream relating to a captured image is received. In step 802, columns are extracted from the captured image and a matrix constructed of the information in the captured image. In step 803, the code is sorted according to distance. The code may be sorted using a variety of sorting algorithms as are known in the art. For example, a selection sorting algorithm may be used. The selection sorting algorithm is beneficial where m is not large. However, if m becomes large, other sorting algorithms (for example, a merge sort) that handle larger number of items more efficiently may be used.

In step 804, M row vectors are selected from the matrix constructed in step 802 and distance vector r is determined from the matrix of 802 to the begging of the array (or m-array).

The captured image may include more information than needed to determine the location of the matrix M. For example, if each bit is represented by 9 pixels and the camera imaging system includes a 32×32 bit matrix, then approximately 100 bits may be obtained (10×10). Of these imaged bits, n are used to determine the location. So, for example, if the array $m_1, m_2$ size was 255×255 (65,025), then the number of bits needed to locate a captured image would be n where $m_1 \times m_2 \leq L = 2^n - 1$. Here, n=16. Accordingly, the number of bits the captured image would need to produce to be able to locate the image is n. In order to provide a variety of different selections to account for error, more than n bits need to be extracted from the image. For example, if the number of n needed is 16, the camera may be needed to produce 18 or more bits.

This analysis is performed K times (for example, 10 to 100 to 500 times) in step 805. The method attempts to determine the position that has the largest number of repeated results and whose number of error bits is less than a value (for example, 3). The system then determines in step 806 whether error correction was performed successfully. If no, then an error is returned in step 809. If yes, then the position of the extracted code is calculated in the sequence (or m-sequence) in step 807 (by, for example, the Pohig-Hellman-Silver algorithm). This step may also include the sub steps of calculating $y_i = y_n / m_1$ and looking up the factors in the group table to get the residual value of $R_i$. This may be expressed as:

$$L = \sum \left(\frac{n}{mi} \cdot Ri \cdot Vi\right) \bmod n \qquad (5)$$

L represents the position in the sequence. Next, the (X, Y) position in the array is expressed as x=L mod $n_1$ and y=L mod $n_2$ and the results returned in step 808.

Location Determination

Figure 9:
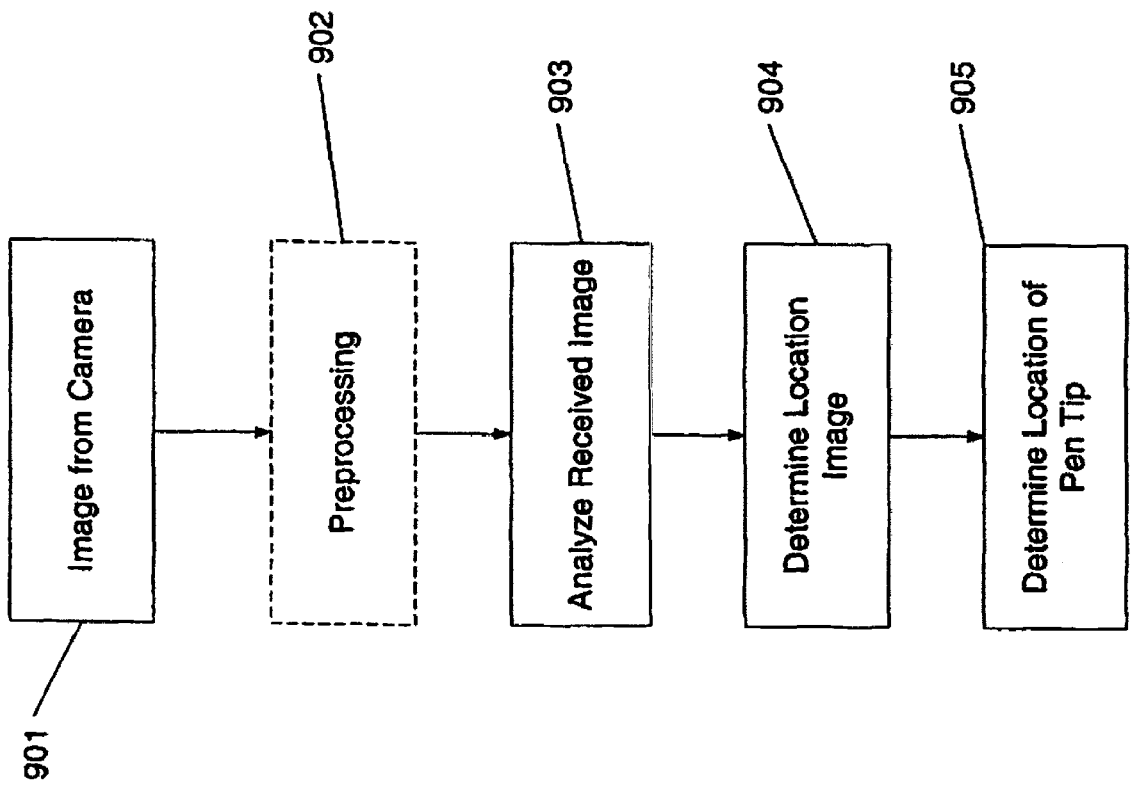
FIG. 9 shows a method for determining the location of a captured image in accordance with embodiments of the present invention.

FIG. 9 shows a process for determining the location of a pen tip. The input is an image captured by a camera and the output may be a position coordinate of the image compared with the total image. Also, the output may include (or not) a rotation angle of the captured image.

In step 901, an image is received from a camera. Next, the received image may be optionally preprocessed in step 902 (as shown by the broken outline of step 902) to adjust the contrast between the light and dark pixels, in an attempt to determine the rotation angle of the captured image, and the like.

Next, in step 903, the image is analyzed to determine the bit stream within it.

Next, in step 904, the bit stream is compared against the original bit stream and the location of the received bit stream within the original bit stream is determined. This comparison may be made when the system is aware of how the original bit stream is wrapped to create the image 403. Finally, once the location of the captured image has been determined in step 904, the location of the pen tip may be determined in step 905.

Figure 10:
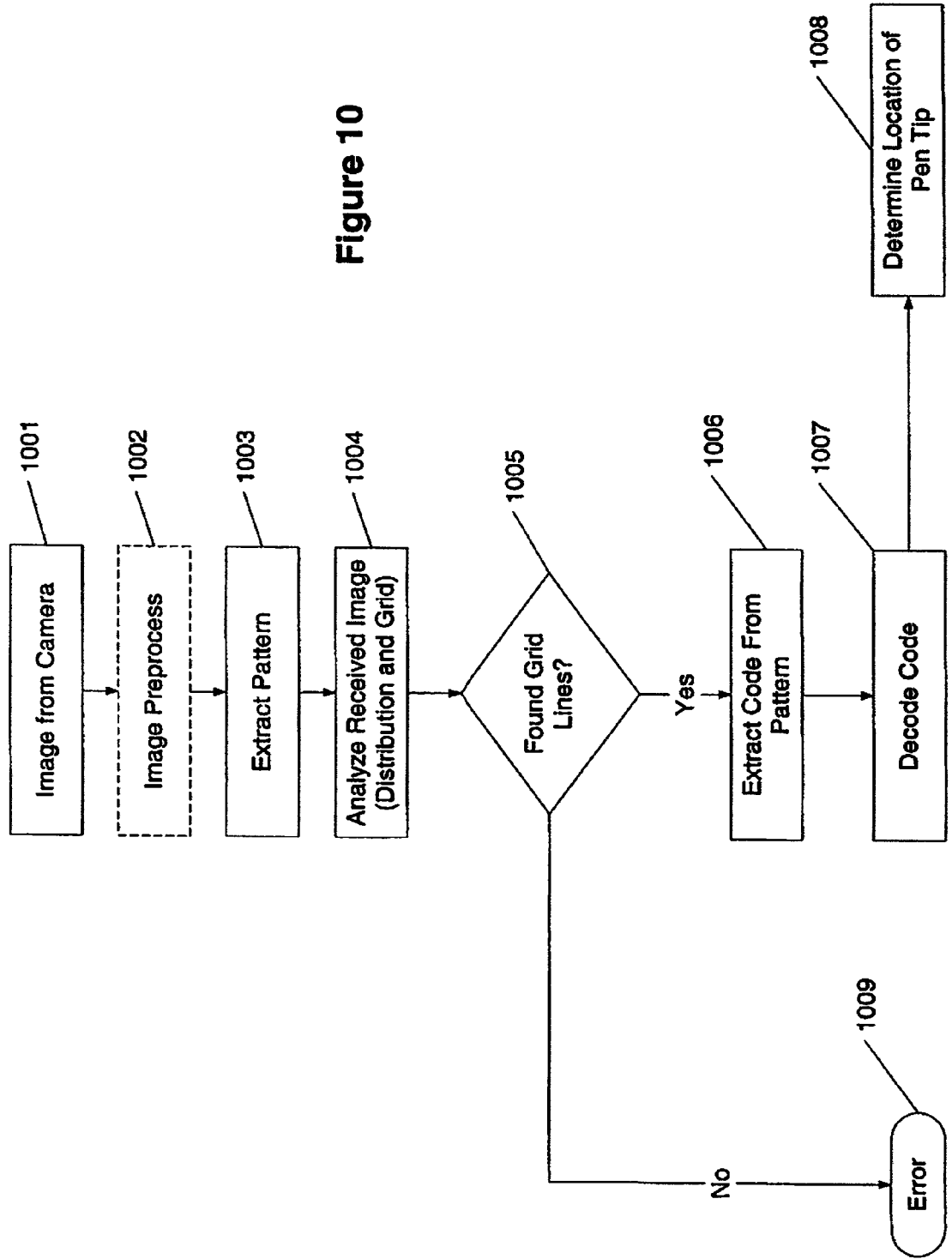
FIG. 10 shows another method for determining the location of captured image in accordance with embodiments of the present invention.

FIG. 10 shows an alternative approach to determining the location of the pen tip. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and determine the angle θ.

Next, the received image is analyzed in step 1004 to determine the underlying distribution of pixels and grid lines. If grid lines are found in step 1005, then the code is extracted from the pattern in step 1006. The code is then decoded in step 1007 and the location of the pen tip determined in step 1008. If no grid lines were found in step 1005, then an error is returned in step 1009.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A method for decoding captured image information performed by a computer having a memory and a processor, the method comprising: with a processor,
   capturing image information, wherein the image information includes a predefined grid orientation comprising a plurality of pixels representing a plurality of corners,
   determining a first angle to rotate the captured image information for decoding based on the predefined grid orientation,
   rotating the captured image information by the determined first angle to provide a first rotated image,
   determining a corner of the plurality of corners that is missing from the first rotated,
   determining a second angle to rotate the first rotated image based upon the determined missing corner,
rotating the first rotated image by the determined second angle to provide a second rotated image,
   decoding said second rotated image,
   error correcting the decoded image, and
   determining locations associated with the error corrected image, 2. The method according to claim 1, wherein decoding the second rotated image includes reading out code from the second rotated image to generate a recovered bit stream and correlating the recovered bit stream with an original bit stream used to generate the predefined grid orientation.

3. The method according to claim 2, wherein correlating the recovered bit stream includes comparing the recovered bit stream against all bit stream fragments within the original bit stream.

4. The method according to claim 2, wherein correlating the recovered bit stream includes using a hamming distance between the recovered bit stream and the original bit stream.

5. The method according to claim 1, wherein the predefined grid orientation is based upon a two-dimensional array, wherein each sub-window of the two-dimensional array having at least n elements is unique in the array and the size of the array is less than or equal to $2^n-1$, wherein the two-dimensional array is a wrapped non-repeating one-dimensional sequence of numbers.

6. A computer-readable medium containing instructions that when executed by a computer perform a method for decoding captured image information, the method comprising:
   capturing image information, the image information including a predefined grid orientation comprising a plurality of pixels representing a plurality of patterns;
   determining a pattern of the plurality of patterns that is missing from the captured image information;
   determining a first angle to rotate the captured image information for decoding based on the predefined grid orientation;
   rotating the captured image information by the determined first angle to provide first rotated image information;
   determining a second angle to rotate the first rotated image information for decoding based upon the determined missing pattern;
   rotating the first rotated image information by the determined second angle to provide second rotated imate information; and
decoding the second rotated image information.

7. The computer-readable medium according to claim 6 wherein each pattern represents a corner in the image information.

8. The computer-readable medium according to claim 6, further comprising:
   determining locations associated with the captured image information.

9. The computer-readable medium according to claim 6, further comprising:
   determining metadata associated with the captured image information.

10. A system for decoding captured image information comprising:
   a component for capturing image information, the image information including a predefined grid orientation, wherein the predefined grid orientation comprises a plurality of pixels representing a plurality of corners;
   a component for determining a first angle to rotate the image information for decoding based on the predefined grid orientation;
   a component for rotating the image information by the determined first angle to provide a first rotated image;
   a component for determining a corner of the plurality of corners that is missing from the first rotated image;
   a component for determining a second angle to rotate the first rotated image for decoding based upon the determined missing corner;
   a component for rotating the first rotated image by the determined second angle to provide a second rotated image;
   a component for decoding the second rotated image;
   a component for error correcting the decoded image;
   a component for determining locations associated with the error corrected image; and
   a component for determining metadata associated with the error corrected image.

* * * * *

UNITED STATES PATENT AND TRADEMARK OFFICE
CERTIFICATE OF CORRECTION

PATENT NO. : 7,639,885 B2  
APPLICATION NO. : 12/131810  
DATED : December 29, 2009  
INVENTOR(S) : Jian Wang et al.

It is certified that error appears in the above-identified patent and that said Letters Patent is hereby corrected as shown below:

In column 13, line 19, in Claim 1, delete "rotated," and insert -- rotated image, --, therefor.

In column 13, line 24, in Claim 1, after "decoding" delete "said" and insert -- the --, therefor.

In column 13, line 27, in Claim 1, delete "image," and insert -- image. --, therefor.

In column 14, line 12, in Claim 6, delete "imate" and insert -- image --, therefor.

Signed and Sealed this  
Tenth Day of May, 2011

David J. Kappos  
*Director of the United States Patent and Trademark Office*